United States Patent Office 3,219,333
Patented Nov. 23, 1965

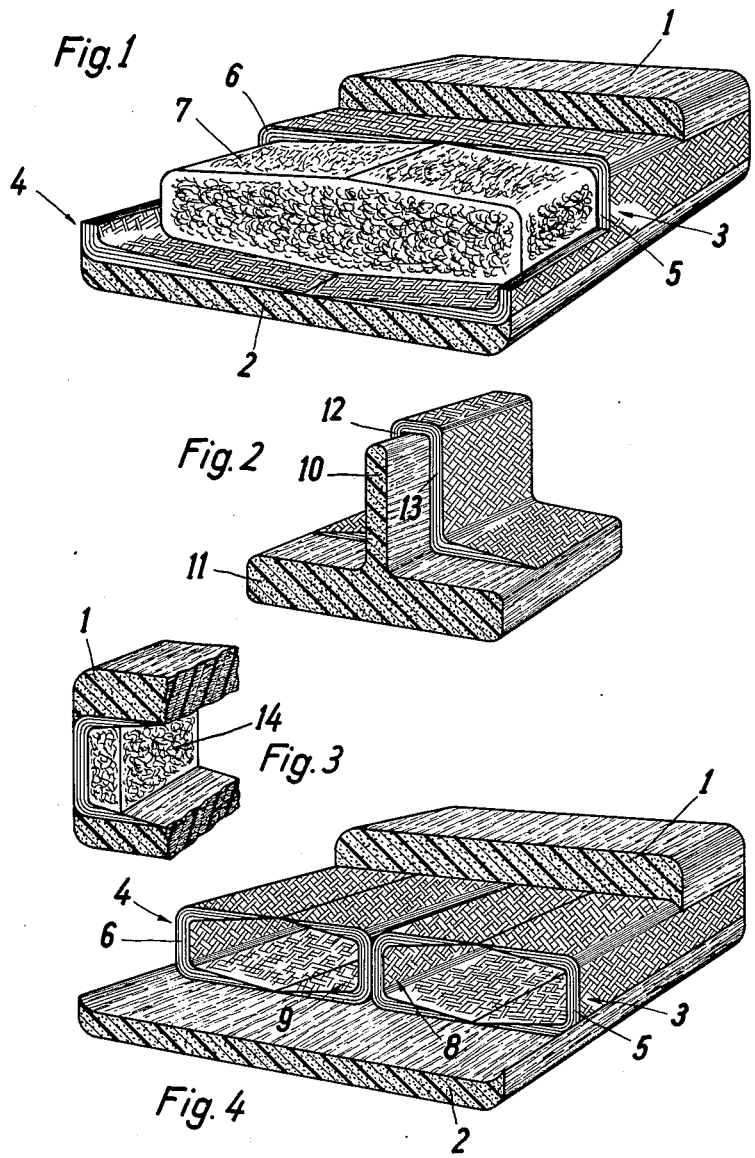

3,219,333
BAR-SHAPED SPRING ELEMENT OR THE LIKE MADE FROM RESINOUS MATERIAL
Hans Derschmidt and Eduard Jarosch, Munich, and Heinz Langer, Ottobrunn, near Munich, Germany, assignors to Bolkow Gesellschaft mit beschrankter Haftung, Munich, Germany
Filed Oct. 14, 1960, Ser. No. 62,584
Claims priority, application Germany, Oct. 15, 1959, B 55,181
5 Claims. (Cl. 267—1)

This invention concerns construction elements made of resinous material.

The present invention is directed to a bar-shaped element or resilient spar which is primarily made from synthetic resin material or similar mass of plastic or plastic composition to be subjected to mechanical energy-absorption conditions. The bar-shaped element may assume any desirable cross-section which is defined by walls or webs subjected to shear stresses. One or more flanges may be thus employed to take up tension and compression forces.

It is one of the objects of the invention to provide means imparting to the aforesaid element such properties and conformation, so that the elements resulting from the concepts of the invention engender relative yieldable or springy characteristics, whereby upon exertion of high mechanical energy absorption a relative small end stress and/or force is required. Besides this, the bar-shaped element or flexible spar is distinguished by its relatively reduced weight.

It is another object of the invention to provide means leading to a solution of a problem according to which the walls or webs to be subjected to shearing stresses are markedly reinforced, having incorporated in the synthetic resinous material glass fibers which extend in a direction of about 45° relative to the longitudinal axis of the element, said fiber reinforcements being applied to and connected with said webs or walls which are under tension or compression loads.

The present invention further proposes a bar-shaped element of the aforesaid type, which may be subjected to bending or flexure and demonstrates not only considerable improvements in regard to a rather soft spring rate, but distinguishes also by a better efficiency of resinous or like plastic material, and is lighter in weight than known flexible spars made from synthetic resin material.

A flexible bending element of the aforesaid type may be used with great advantage in the manufacture of automotive vehicles, and in particular, in airplane construction, where such elements may be used as flexible spar, e.g. shock absorbing strut, or, for instance, as an axle spring or as slide bars in sailplane construction, helicopters, autogyros and like automotive devices.

In furtherance of this invention, it is also proposed in order to additionally reduce the weight, that the thickness of the shear webs corresponds to the magnitude of the shear-flow.

In order to obtain in such flexible spar or element pursuant to the invention a still higher capacity to withstand tension and compression forces or loads, the invention further contemplates as another characteristic or feature that the walls or webs subjected to tension and compression forces, respectively, are markedly reinforced by glass fiber rovings, which are also embedded in the synthetic resinous material.

In order to increase the stability of the webs or walls, it is further contemplated by the present invention that these walls and webs, respectively, are supported by elements of relatively low specific weight.

In flexible spars with closed formation and cross-section the aforesaid construction element may form a core in accordance with this invention. By using a core structure considerable manufacturing facilities and great advantages are attained, which are directed to a simplified manufacture of such glass fiber or like reinforcements.

These and other objects of the invention will become further apparent from the following detailed description, reference being made to the accompanying drawing showing preferred embodiments of the invention.

In the drawing:

FIG. 1 illustrates a stepwise section through a flexible spar containing a core shown in perspective and constructed in accordance with the invention;

FIG. 2 is a perspective and cross-sectional view of a flexible spar of T-profile and embodying the present invention;

FIG. 3 is a fragmentary perspective view of a flexible spar of a closed cross-sectional formation with additional shearing webs located therein extending in the direction of the axis of symmetry; and FIG. 4 is a stepwise sectional view of a flexible spar element seen in perspective and showing the cross-section of the element with its webs serving to increase the stability of the web structure.

Referring now more particularly to the drawing, there is disclosed a flexible spar or element of box-shaped configuration provided with an upper flange part 1, a lower flange part 2, both of which being made from synthetic resin material, such as, for instance, cast synthetic or plastic mass.

Webs 3 and 4 which are subjected to shear also consist of synthetic plastic material and are connected to the parts 1 and 2.

In accordance with the invention these webs 3 and 4 have incorporated therein glass fiber reinforcements embedded in the synthetic material, the fiber direction extending at about 45° to the longitudinal axis of the element.

Due to the inventive arrangement of the glass fiber reinforcement in the webs 3 and 4, the shearing forces which act between the parts 1 and 2, upon loading or stressing of the element, are absorbed by webs 3 and 4 in an optimum manner, whereby advantages are achieved in view of the relative soft spring rate presented, so that upon exertion of high mechanical energy absorption a relative reduced end force and small weight are obtained. These advantages are of great interest for elements or flexible spars employable in airplane construction for instance, as shock absorbing strut.

In order to achieve an additional reduction of weight, the invention further provides that the thickness of the shear webs 3 and 4 corresponds to the magnitude of the shear-flow.

In order to obtain a higher capacity to withstand tension or compression force, the aforesaid flanges 1 and 2 are further improved by glass or like fiber rovings embedded in the synthetic material.

FIG. 3 shows another embodiment of the invention presenting a flexible spar, which also is box-shaped in cross-section. This flexible spar or element corresponds principally to that disclosed in FIG. 1, and corresponding parts are designated by the same reference numerals.

In contradistinction to FIG. 1, the element of FIG. 4 sohws, besides lateral webs 3 and 4 additional glass fiber laminates in the form of webs 8 and 9, which increases the stability of the structural element or flexible spar, the glass fibers of which are embedded at an angle of about 45° in the synthetic resin material in a specific pattern.

FIG. 2 shows the element in T-shaped cross-sectional conformation which is open and accessible, the flange 11 and web 10 being made from synthetic material or suitable mass of plastic or plastic composition having incorporated therein glass fiber rovings.

In order to take up and transmit any shear forces which attack or are directed against web 10, the latter is encased by glass fiber reinforcements 12, 13 which run at about 45° to the axis of the T-shaped element. The shear and normal forces which stress flange 11 are taken up by the latter, as such tension and compression forces are diffused to said flange.

In accordance with a further feature of the invention shown in FIG. 3, besides glass fiber reinforcements employed for the webs or walls, there may also be disposed laterally thereto elements 14 which are of reduced specific weight and of any suitable material serving the purpose of forming inner reinforcements.

These auxiliary constructural element parts are formed of rigid foamed plastic and, for the sake of simplicity, there is shown in FIG. 3 only a part thereof, which fulfills the task to stabilize the element by supporting the walls thereof, which will be subjected to shearing forces. Such auxiliary element parts can also be employed advantageously for additional support of web 10 in accordance with FIG. 2.

According to another feature of the invention, the construction element part 14 may also be used in flexible spars with closed box-shaped cross-section in which such part is contained as solid core filling out the interior of said box-shaped conformation.

As seen in FIG. 1, the flexible spar has such a core, in such case an element made of rigid foamed plastic which completely fills the interior. It is also within the concept of the invention to use a core other than foamed plastic, namely a specific light-weight material, such as balsa-wood, honey combs and the like.

Due to the employment of a core an increase in stability of the construction element by supporting the walls or webs subjected to shear is attained and the manufacture of the element and in particular the application of glass fiber reinforcements on the webs 3 and 4 thereof is considerably simplified. Synthetic resin material may be more economically used, and the total weight of the element or flexible spar is inordinately reduced.

The reinforcement of the walls and/or webs of such a flexible spar subjected to bending forces is not limited to any particular synthetic material in which the glass fibers are embedded, as various bonding resins known to those skilled in the art may be used. The essential feature is that the glass fibers, which are bonded by or embedded in the resin and forming the webs, extend at an angle of about 45° to the longitudinal axis of the element or to the general planes of the members 1 and 2.

The invention is not limited to the various embodiments shown or described herein and is applicable to other profiles of symmetrical or asymmetrical cross-section. The advantages in regard to soft spring rate or smooth yieldability, that is at high mechanical energy absorption a low elastic end force, are, among others, a better efficiency of material respecting minimum weight-design even with respect to bending elements of asymmetrical cross-section.

Various changes and modifications may be made without departing from the spirit and scope of the present invention, and it is intended that such obvious changes and modifications be embraced by the annexed claims.

Having thus described the invention, what is claimed as new and desired to be secured by Letters Patent, is:

1. A substantially rectilinear longitudinally elongated spring element comprising a bar having spaced resilient relatively flat flanges made of a plastic material and a wall portion disposed therebetween and interconnecting said flanges, said wall portion extending substantially parallel to and adjacent each flange and also perpendicularly thereto adjacent at least one common edge of said flanges, including reinforcing fibers disposed at an angle in respect to the plane of said flanges and intimately connecting said flanges and distributing forces which act on the bar.

2. A relatively long substantially rectilinear flexible element made of synthetic resinous material comprising upper and lower relatively flat flange portions of a material such as a synthetic which is cast and capable of taking up high energy absorption, a webbing disposed between said flanges including a portion extending substantially parallel to and directly adjacent each of said flanges and a side portion extending substantially perpendicularly thereto, said webbing being made of a synthetic material having glass fibers therein and forming a reinforcement therefor, said glass fibers running at an angle of approximately 45° with respect to the longitudinal axis of said element, said glass fibres connecting with and presenting a transitional formation wtih the upper and lower flanges and said webbing, and a core of plastic material.

3. A relatively elongated substantially rectilinear and integrated spring element comprising at least one normally substantially horizontal flange of substantially rectangular cross section and subjected to loading substantially normal to its greater lateral dimension, said flange comprising molded synthetic resin material; and at least one substantially planar web of substantially rectangular cross section extending longitudinally of said flange and substantially normal thereto, said web comprising resin bonded glass fibers extending at an angle of substantially 45° to the plane of said flange; said web being integrated with said flange so that said glass fibers are intimately connected with said flange to provide a transitional formation absorbing said loading on said flange, the shear stresses on said fibers at the normally substantially horizontal center line of said web being at a minimum.

4. A substantially rectilinear longitudinally elongated spring element according to claim 3, wherein there are at least two separate webs including fibers disposed at an angle in respect to the plane of said flange.

5. A longitudinally elongated flexible element according to claim 4, wherein said separate wall portions comprise tubular elements having reinforcing fibers therein disposed side by said between said flange portion.

References Cited by the Examiner
UNITED STATES PATENTS

| | | | |
|---|---|---|---|
| 2,414,125 | 1/1947 | Rheinfrank | 154—43 |
| 2,594,838 | 4/1952 | Alexander et al. | 138—76 |
| 2,870,793 | 1/1959 | Bailey | 138—78 |

EARL M. BERGERT, *Primary Examiner.*

CARL F. KRAFFT, *Examiner.*